(12) United States Patent
Von Novak et al.

(10) Patent No.: US 10,082,869 B2
(45) Date of Patent: Sep. 25, 2018

(54) MAINTAINING OCCUPANT AWARENESS IN VEHICLES

(71) Applicant: QUALCOMM Incorporated, San Diego, CA (US)

(72) Inventors: William Henry Von Novak, San Diego, CA (US); Muhammed Ibrahim Sezan, Los Gatos, CA (US); Somdeb Majumdar, Mission Viejo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 15/423,994

(22) Filed: Feb. 3, 2017

(65) Prior Publication Data

US 2018/0224932 A1    Aug. 9, 2018

(51) Int. Cl.
*B60K 35/00* (2006.01)
*G06F 3/01* (2006.01)
(Continued)

(52) U.S. Cl.
CPC .............. *G06F 3/013* (2013.01); *B60K 35/00* (2013.01); *G06T 11/60* (2013.01);
(Continued)

(58) Field of Classification Search
CPC combination set(s) only.
See application file for complete search history.

(56) References Cited

U.S. PATENT DOCUMENTS 9,129,505 B2 *   9/2015  Breed ................. G08B 21/0407
9,189,692 B2 *  11/2015  Konigsberg ........... G08B 21/06
(Continued)

FOREIGN PATENT DOCUMENTS

EP         3040809 A1     7/2016
KR      20160064388 A     6/2016
(Continued)

OTHER PUBLICATIONS

Krafka, et al., "Eye Tracking for Everyone," In 29th IEEE Conference on Computer Vision and Pattern Recognition, Jun. 26-Jul. 1, 2016, pp. 2176-2184.
(Continued)

*Primary Examiner* — Wesner Sajous
(74) *Attorney, Agent, or Firm* — Shumaker & Sieffert, P.A.

(57) ABSTRACT

In general, techniques are described for maintaining occupant awareness in vehicles. A device configured to maintain occupant awareness in a vehicle comprising: a processor and a display may be configured to perform the techniques. The processor may determine a location at which an occupant is gazing, and generate, when the determined location indicates that the occupant is not focused on a direction in which the vehicle is traveling, one or more contextual images capable of assisting the occupant in maintaining awareness of a context in which the vehicle is currently operating. The display may present, based on the determined location, the one or more contextual images proximate to the determined position within the cabin of the vehicle to assist the occupant in assuming control of the vehicle when the vehicle is no longer able to autonomously control the operation of the vehicle.

30 Claims, 11 Drawing Sheets

(51) Int. Cl.
*G06T 11/00* (2006.01)
*G06T 11/60* (2006.01)

(52) U.S. Cl.
CPC .......... *B60K 2350/1096* (2013.01); *B60K 2350/2052* (2013.01); *B60K 2350/352* (2013.01); *B60K 2350/965* (2013.01)

(56) References Cited

U.S. PATENT DOCUMENTS

| | | |
|---|---|---|
| 2003/0169213 A1 | 9/2003 | Spero |
| 2006/0087416 A1* | 4/2006 | Kumabe ................ B60Q 1/50 340/435 |
| 2007/0010944 A1 | 1/2007 | Ferrebee et al. |
| 2010/0253539 A1 | 10/2010 | Seder et al. |
| 2010/0253596 A1 | 10/2010 | Szczerba et al. |
| 2012/0093358 A1 | 4/2012 | Tschirhart |
| 2012/0271484 A1* | 10/2012 | Feit ...................... B60W 30/09 701/1 |
| 2012/0306637 A1* | 12/2012 | McGough ............ B60K 37/06 340/439 |
| 2015/0006278 A1* | 1/2015 | Di Censo ........... G06Q 30/0244 705/14.43 |
| 2015/0138065 A1 | 5/2015 | Alfieri |
| 2015/0235096 A1* | 8/2015 | Konigsberg ........... G08B 21/06 340/439 |
| 2015/0296135 A1* | 10/2015 | Wacquant ............... G06F 3/013 348/207.11 |
| 2016/0009411 A1* | 1/2016 | Davalos ................ B64D 47/02 345/156 |
| 2016/0068103 A1 | 3/2016 | McNew et al. |
| 2016/0148064 A1 | 5/2016 | Heo et al. |
| 2016/0163108 A1 | 6/2016 | Kim |
| 2016/0173865 A1 | 6/2016 | Park |
| 2016/0205238 A1* | 7/2016 | Abramson ......... G01C 21/3484 455/456.4 |
| 2016/0264045 A1 | 9/2016 | Ng-Thow-Hing et al. |
| 2018/0043888 A1* | 2/2018 | Wolf ....................... B60R 1/00 |

FOREIGN PATENT DOCUMENTS

| | | |
|---|---|---|
| WO | 2004052691 A1 | 6/2004 |
| WO | 2011155878 A1 | 12/2011 |
| WO | 2013022577 A1 | 2/2013 |
| WO | 2013101044 A1 | 7/2013 |
| WO | 2016005649 A1 | 1/2016 |

OTHER PUBLICATIONS

Kim, et al., "Vision-Based Eye-Gaze Tracking for Human Computer Interface," in Proceedings of IEEE International Conference on Systems, Man and Cybernetics, vol. 2, Oct. 12-15, 1999, pp. 324-329.

International Search Report and Written Opinion—PCT/US2017/064866—ISA/EPO—dated Jan. 31, 2018.

* cited by examiner

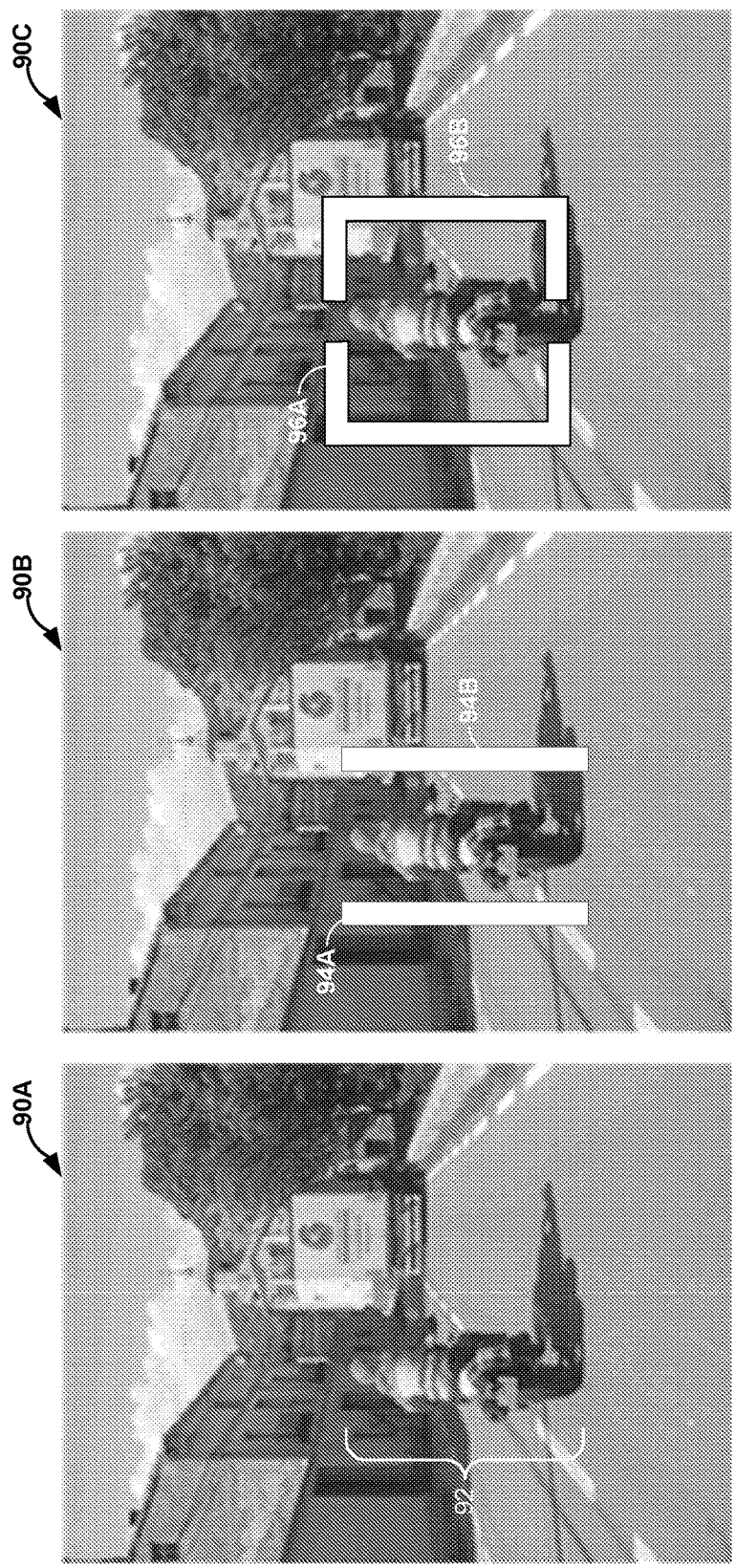

MAINTAINING OCCUPANT AWARENESS IN VEHICLES

TECHNICAL FIELD

This disclosure relates to vehicles and, particularly, to maintaining awareness in vehicles.

BACKGROUND

Vehicles are increasingly becoming more autonomous. That is, vehicles are beginning to perform tasks that an occupant would normally perform without any occupant interaction. Levels of autonomy for vehicles have been defined with level zero generally indicating no automation up to level four or five, which may refer to a fully autonomous vehicle where an individual need only specify a destination to which the fully autonomous vehicle is to drive.

Currently, most production vehicles fall between levels zero and five. Mid-level (e.g., levels two through three) autonomous vehicles may perform some tasks normally performed by an occupant when operating the vehicle using adaptive cruise control, providing lane monitoring, and performing automated crash avoidance (usually by applying the brakes), etc.

In mid-level autonomous vehicles and even in fully autonomous (e.g., level four or five) vehicles, when problems arise for which the vehicle is not equipped to handle, the autonomous vehicle may transition control of the vehicle back to the occupant. The occupant may then operate the vehicle until the problem has been overcome.

SUMMARY

In general, the disclosure describes techniques for maintaining occupant awareness in autonomous vehicles such that the occupant can resume operation of the vehicle, e.g., when problems arise for which the vehicle is not equipped to handle.

In one example, the disclosure describes a method of maintaining occupant awareness in a vehicle, the method comprising determining, by one or more processors, a location at which an occupant within the vehicle is gazing. The method also comprising generating, by the one or more processors and when the determined location indicates that the occupant is not focused on a direction in which the vehicle is traveling, one or more contextual images capable of assisting the occupant in maintaining awareness of a context in which the vehicle is currently operating. The method further comprising presenting, by a display and based on the determined location, the one or more contextual images.

In one example, the disclosure describes a device configured to maintain occupant awareness in a vehicle, the device comprising one or more processors configured to determine a location at which an occupant is gazing. The one or more processors also configured to generate, when the determined location indicates that the occupant is not focused on a direction in which the vehicle is traveling, one or more contextual images capable of assisting the occupant in maintaining awareness of a context in which the vehicle is currently operating. The device further comprising a display configured to present, based on the determined location, the one or more contextual images proximate to the determined position within the cabin of the vehicle to assist the occupant in assuming control of the vehicle when the vehicle is no longer able to autonomously control the operation of the vehicle.

In one example, the disclosure describes a device configured to maintain occupant awareness in a vehicle, the device comprising means for determining a location at which an occupant within the vehicle is gazing, means for generating, when the determined location indicates that the occupant is not focused on a direction in which the vehicle is traveling, one or more contextual images capable of assisting the occupant in maintaining awareness of a context in which the vehicle is currently operating, and means for presenting, based on the determined location, the one or more contextual images.

In one example, the disclosure describes a non-transitory computer-readable storage medium having stored thereon instructions that, when executed, cause one or more processors of a vehicle to determine a location at which an occupant within the vehicle is gazing, generate, when the determined location indicates that the occupant is not focused on a direction in which the vehicle is traveling, one or more contextual images capable of assisting the occupant in maintaining awareness of a context in which the vehicle is currently operating, and interface with a display to present, based on the determined location, the one or more contextual images.

The details of one or more examples are set forth in the accompanying drawings and the description below. Other features, objects, and advantages will be apparent from the description, drawings, and claims.

BRIEF DESCRIPTION OF DRAWINGS

FIGS. 5A-5C are diagrams showing example forward views having different levels of emphasis applied in accordance with various aspects of the techniques described in this disclosure.

DETAILED DESCRIPTION

Figure 1:
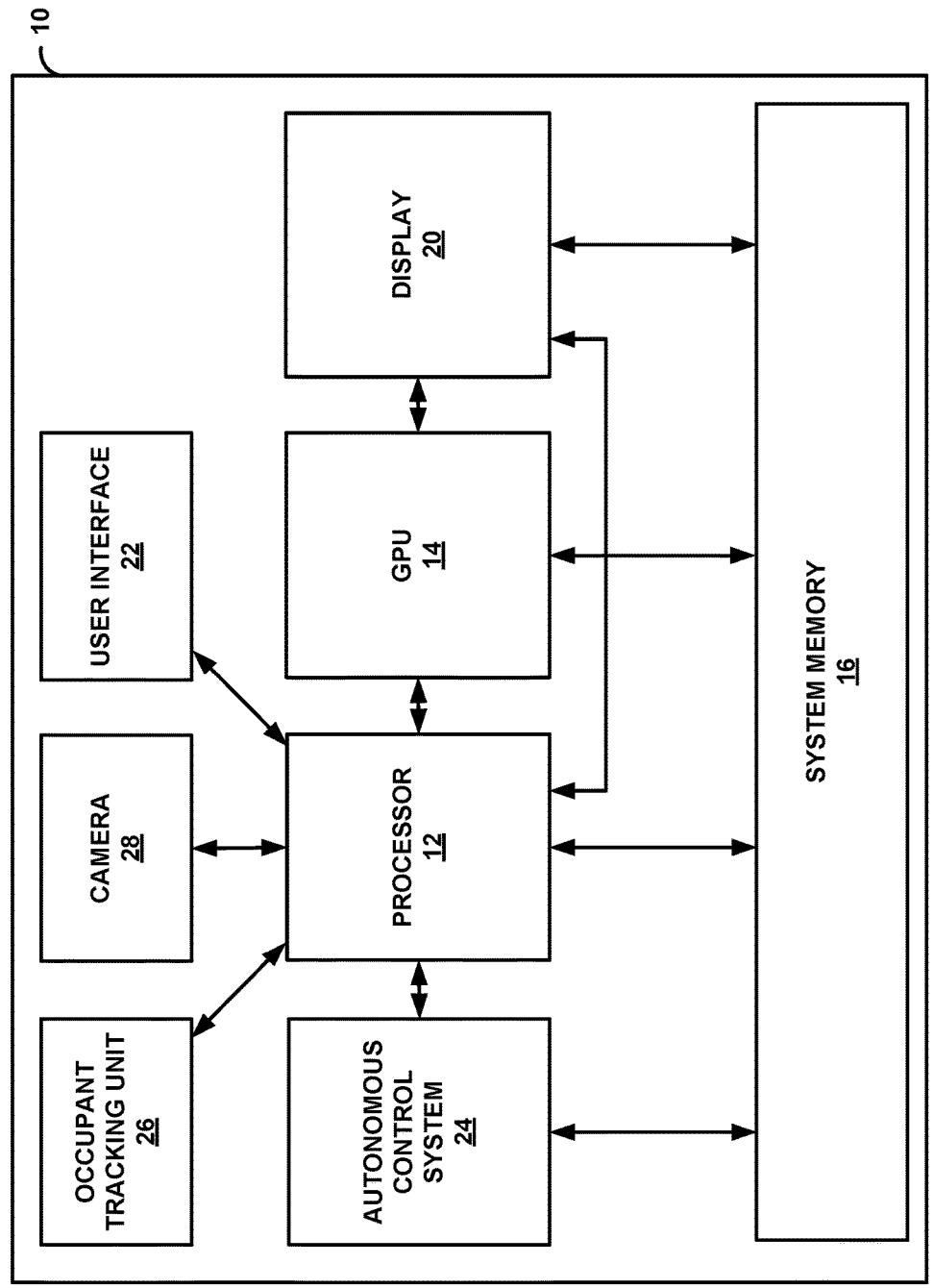
FIG. 1 is a block diagram illustrating an example autonomous vehicle configured to perform various aspects of the occupant awareness techniques described in this disclosure.

As an occupant of an autonomous vehicle becomes less involved in the operation of the vehicle, the occupant may become distracted and/or complacent, spending no more time on driving tasks than is necessary. However, autonomous vehicles may transfer control of the vehicle to the occupant. For example, an autonomous vehicle may transfer control of the vehicle to the occupant when problems occur for which the autonomous vehicle is not equipped to handle. The occupant assuming control may be referred to as a "primary occupant" as this occupant is primarily responsible for assuming control, e.g., when the autonomous vehicle may no longer safely autonomously control the vehicle.

Transitioning control of the autonomous vehicle to the primary occupant may occur suddenly, such as when equipment used to provide the automation fails due to weather, malfunction and the like. Sudden transitions of control to a potentially distracted primary occupant may not give the primary occupant time to regain sufficient context in which to safely operate the vehicle.

Various aspect of the techniques set forth in this disclosure may facilitate occupant awareness in autonomous vehicles when the vehicle has automated some aspect of the driving. The techniques may maintain occupant awareness so that the primary occupant and potentially other occupants may monitor the current driving context should the primary occupant be suddenly (e.g., within minutes or, in some instances, seconds) put in control of the vehicle. Such driving context may allow the primary occupant to more safely operate the vehicle upon receiving sudden control.

One aspect of the techniques may include recreating a forward view (referring to a view out of the front windshield of the car) in whatever direction the occupant is looking while the autonomous vehicle is in control. In some examples, the autonomous vehicle may display the forward view behind entertainment material or as a picture within a picture of the entertainment material (which is often referred to as "picture-in-picture").

The autonomous vehicle may also present, via a heads-up display (such as an augmented reality headset or in-dash heads-up display), images that trigger physiological reactions in the occupant to regain the driving awareness. The autonomous vehicle, while in control of operation of the vehicle, may present emphasis around identified objects viewed in the heads-up display. For example, the autonomous vehicle may interface with the heads-up display to frame a motorcycle or other vehicle on the road that may be relatively small but of importance in terms of awareness.

As further examples, when a car traveling within the vicinity of the autonomous vehicle communicates to the autonomous vehicle (directly or indirectly) that the car has identified a hazard, the autonomous vehicle may present images that emphasize the car detecting the hazard more than other cars that have not communicated detection of the hazard. The autonomous vehicle, may as another example, emphasize one or more other vehicles traveling with the autonomous vehicle based on how much the one or more other vehicles are swerving in the lane, how much the one or more other vehicles are accelerating/decelerating or how often the one or more other vehicles changes lanes, etc. The autonomous vehicle may also emphasize the one or more other vehicles based on color (or contrast), where darker vehicles (or vehicles with low-contrast appearance, e.g., due to sun glare or other ambient light conditions) may be emphasized more considering that darker colors (or low-contrast objects) are more difficult to identify.

The autonomous vehicle may interface with the heads-up display to insert artificial objects emphasizing various conditions or vehicles that may trigger a physiological reaction in the occupant. For example, the autonomous vehicle may insert artificial lane marker objects at the detected edges of the lane, keeping such lane markers small when under safe operation of the vehicle but enlarging such lane markers to create visual arousal prior to transitioning control to the occupant so as to regain occupant awareness.

FIG. 1 is a block diagram illustrating components of an example autonomous vehicle 10 configured to perform various aspects of the occupant awareness techniques described in this disclosure. In the example of FIG. 1, autonomous vehicle 10 may represent a vehicle configured to automate one or more tasks associated with operation of vehicle 10, including automating most if not all of the tasks associated with operation of vehicle 10 such that an occupant need not, under most conditions, maintain awareness of a context in which vehicle 10 is operating.

Autonomous vehicle 10 is assumed in the description below to be an automobile. However, the techniques described in this disclosure may apply to any type of vehicle capable of conveying one or more occupants and being autonomously operated, such as a motorcycle, a bus, a recreational vehicle (RV), a semi-trailer truck, a tractor or other type of farm equipment, a train, a plane, a helicopter, a drone, a personal transport vehicle, and the like.

In the example of FIG. 1, autonomous vehicle 10 includes a processor 12, a graphics processing unit (GPU) 14, and system memory 16. In some examples, processor 12, GPU 14, and transceiver module 22 may be formed as an integrated circuit (IC). For example, the IC may be considered as a processing chip within a chip package, and may be a system-on-chip (SoC).

Examples of processor 12, and GPU 14 may include fixed function processing circuitry and/or programmable processing circuitry, and may include, but not be limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of autonomous vehicle 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

Processor 12 may execute various types of applications. Examples of the applications include navigation applications, vehicle control applications, scheduling application, safety applications, web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing based on instructions or commands that processor 12 transmits to GPU 14.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 to perform the functions ascribed in this disclosure to processor 12. Accordingly, system memory 16 may be a computer-readable storage medium having instructions stored thereon that, when executed, cause one or more processors (e.g., processor 12) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from autonomous vehicle 10, and moved to another device. As another example, memory, substantially similar to system memory 16, may be inserted into autonomous vehicle 10. In certain examples, a non-transitory storage medium may store data that can, over time, change (e.g., in RAM).

As further shown in the example of FIG. 1, autonomous vehicle 10 may include a display 20 and a user interface 22. Display 20 may represent any type of passive reflective screen on which images can be projected, or an active reflective, emissive, or transmissive display capable of projecting images (such as a light emitting diode (LED) display, an organic LED (OLED) display, liquid crystal display (LCD), or any other type of active display). Although shown as including a single display 20, autonomous vehicle 10 may include a plurality of displays that may be positioned throughout the cabin of autonomous vehicle 10. In some examples, passive versions of display 20 or certain types of active versions of display 20 (e.g., OLED displays) may be integrated into seats, tables, roof liners, flooring, windows (or in vehicles with no windows or few windows, walls) or other aspects of the cabin of autonomous vehicles. When display 20 represents a passive display, display 20 may also include a projector or other image projection device capable of projecting or otherwise recreating an image on passive display 20.

Display 20 may also represent displays in wired or wireless communication with autonomous vehicle 10. Display 20 may, for example, represent a computing device, such as a laptop computer, a heads-up display, a head-mounted display, an augmented reality computing device or display (such as "smart glasses"), a virtual reality computing device or display, a mobile phone (including a so-called "smart phone"), a tablet computer, a gaming system, or another type of computing device capable of acting as an extension of, or in place of, a display integrated into autonomous vehicle 10.

User interface 22 may represent any type of physical or virtual interface with which a user may interface to control various functionalities of autonomous vehicle 10. User interface 22 may include physical buttons, knobs, sliders or other physical control implements. User interface 22 may also include a virtual interface whereby an occupant of autonomous vehicle 10 interacts with virtual buttons, knobs, sliders or other virtual interface elements via, as one example, a touch-sensitive screen, or via a touchless interface. The occupant may interface with user interface 22 to control one or more of a climate within autonomous vehicle 10, audio playback by autonomous vehicle 10, video playback by autonomous vehicle 10, transmissions (such as cellphone calls, video conferencing calls, and/or web conferencing calls) through autonomous vehicle 10, or any other operation capable of being performed by autonomous vehicle 10.

User interface 22 may also represent interfaces extended to display 20 when acting as an extension of, or in place of, a display integrated into autonomous vehicle 10. That is, user interface 22 may include virtual interfaces presented via the above noted HUD, augmented reality computing device, virtual reality computing device or display, tablet computer, or any other of the different types of extended displays listed above.

In the context of autonomous vehicle 10, user interface 22 may further represent physical elements used for manually or semi-manually controlling autonomous vehicle 10. For example, user interface 22 may include one or more steering wheels for controlling a direction of travel of autonomous vehicle 10, one or more pedals for controlling a rate of travel of autonomous vehicle 10, one or more hand brakes, etc.

Autonomous vehicle 10 may further include an autonomous control system 24, which represents a system configured to autonomously operate one or more aspects of vehicle 10 without requiring intervention by an occupant of autonomous vehicle 10. Autonomous control system 24 may include various sensors and units, such as a global positioning system (GPS) unit, one or more accelerometer units, one or more gyroscope units, one or more compass units, one or more radar units, one or more LiDaR (which refers to a Light Detection and Ranging) units, one or more cameras, one or more sensors for measuring various aspects of vehicle 10 (such as a steering wheel torque sensor, steering wheel grip sensor, one or more pedal sensors, tire sensors, tire pressure sensors), and any other type of sensor or unit that may assist in autonomous operation of vehicle 10.

In this respect, autonomous control system 24 may control operation of vehicle 10, allowing the occupant to participate in tasks unrelated to the operation of vehicle 10. As the occupant of autonomous vehicle 10 becomes less involved in the operation of vehicle 10, the occupant may become distracted and/or complacent, spending no more time on driving tasks than is necessary. However, autonomous vehicle 10 may transfer control of vehicle 10 to the occupant when problems occur for which autonomous vehicle 10 is unequipped to handle. The occupant assuming control may be referred to as a "primary occupant" as this occupant is primarily responsible for assuming control when autonomous vehicle 10 may no longer safely autonomously control vehicle 10.

Transitioning control of autonomous vehicle 10 to the primary occupant may occur suddenly, such as when equipment used by autonomous control system 24 fails due to weather, malfunction and the like. Sudden transitions of control to a potentially distracted primary occupant may not give the primary occupant time to regain sufficient context in which to safely operate vehicle 10.

Transferring control may refer to returning responsibility of control to the occupant such that the occupant directs operation of vehicle 10 (e.g., using a steering wheel, pedals and other implements in traditional vehicles, or using various non-traditional interfaces, such as virtual interfaces that allow for acceleration, braking, and steering). Transferring control may also be only partial transfer of control depending on the circumstances. For example, a sensor allowing for determination of a rate of travel may fail, but all other autonomous control systems for steering and navigation may be operational. In this example, vehicle 10 may transfer control of acceleration and braking but retain control of steering and navigation. As such, vehicle 10 may transfer control of the operation of vehicle 10 when responsibility for one or more autonomously performed operations are transferred to the occupant.

In accordance with various aspects of the techniques described in this disclosure, autonomous vehicle 10 may maintain occupant awareness so that the primary occupant and potentially other occupants may monitor a current driving context should the primary occupant be suddenly put in control of vehicle 10. Such driving context may allow the primary occupant to more safely operate the vehicle upon a transfer of control from autonomous control system 10 to the primary occupant.

In operation, vehicle 10 may include an occupant tracking unit 26 configured to determine a location at which an occupant is gazing, which may be referred to as the "eye gaze location." In some examples, occupant tracking unit 26 may include a camera or other image capture device configured to capture one or more images of the primary occupant. Occupant tracking unit 26 may position the camera (e.g., rotate the camera to a particular azimuth and elevation) to allow capture of the images of the primary occupant as the primary occupant moves about the cabin of vehicle 10.

To determine the position at which the occupant is gazing (or, in other words, focused), occupant tracking unit 26 may perform one or more of eye tracking (which may also be referred to as "gaze tracking") with respect to the images depicting the primary occupant. More information on eye tracking can be found in a paper by Krafka et al., entitled "Eye Tracking for Everyone," dated May 5, 2016, and another paper by Kim et al., entitled "Vision-Based Eye-Gaze Tracking for Human Computer Interface," dated Oct. 12-15, 1999.

Generally, eye tracking tracks the movement of the pupil through the use of corneal reflections created by projections of infrared and/or near infrared non-collimated light. As such, occupant tracking unit 26 may include an infrared and/or a near infrared light source to create a bright pupil effect similar to what is commonly known as "red eye" in the images. Occupant tracking unit 24 may generally track the primary occupant and then zoom in on the primary occupant's face or eyes to capture images of at least one eye of the occupant while illuminating the eye with the infrared and/or near infrared light source. The extent of the corneal reflection is represented in the images of the eyes of the occupant in terms of brightness. The brightness of the pupil in the image of the eyes indicates how directly the pupil is focused on the infrared and/or near infrared light source, where higher brightness indicates more direct focus. From this brightness of the pupil, the occupant tracking unit 26 may determine the location at which the primary occupant is gazing.

Although occupant tracking unit 26 is described as performing the determination of the location at which the occupant is focused, occupant tracking unit 26 may perform only aspects of the eye tracking described above. For example, occupant tracking unit 26 may generally track the primary occupant, capturing the images of the eyes of the occupant while directing the infrared and/or near infrared light sources in such a manner as to create the corneal reflections. Occupant tracking unit 26 may next provide the images of the eyes of the occupant to processor 12 for determining the location at which the occupant is gazing.

Assuming that occupant tracking unit 26 determines the location at which the primary occupant is gazing, occupant tracking unit 26 may provide the determined location to processor 12. Based on the determined location, processor 12 may determine whether the primary occupant is gazing in a direction that allows the primary occupant to maintain a proper driving context sufficient to take over control of vehicle 10. This location that allows the primary occupant to maintain a proper driving context (which may be referred to as a "context aware locations") may include locations that allow the primary occupant to have a direct view of the direction in which vehicle 10 is traveling. Such context aware positions may be defined as one or more angles from the primary occupant out the windshield or other forward facing window when traveling forward. Occupant tracking unit 26 may determine the context aware locations, or processor 12 may determine the context aware positions when occupant tracking unit 26 does not perform eye tracking.

Processor 12 may compare the determined location to the context aware locations. When the determined focus location falls within the one or more angles defining the context aware locations, processor 12 may determine that the primary occupant is focused on the driving context. Although described as determining that the primary occupant is focused on the driving context based on the comparison of the determined focus location to the one or more angles defining the context aware locations, processor 12 may base the determination on additional information, including a detected heart rate of the primary occupant, a determined tiredness of the primary occupant (through eye tracking that detects more frequent blinking or a consistent lowering of the determined focus position, primary occupant images that detects yawning, etc.) or any other image analysis and/or sensor signal analysis.

When the determined focus location falls outside of the one or more angles defining the context aware locations, processor 12 may determine that the primary occupant is not focused on the direction in which vehicle 10 is traveling (which is assumed to be forward). Processor 12 may, when the determined location indicates that the primary occupant is not focused on direction in which vehicle 10 is traveling, generate one or more images capable of assisting the primary occupant in maintaining awareness of an operating context in which vehicle 10 is currently operating. For example, processor 12 may interface with a camera 28 to capture one or more images depicting a forward view of vehicle 10, where such forward view depicts a view along, or in the forward direction of travel of vehicle 10. That is, vehicle 28 may include a camera 28 mounted either within the cabin or external from the cabin configured to capture the forward view.

As another example, processor 12 may generate a plan view of vehicle 10, where the plan view may provide a top-down view of vehicle 10 and various objects around vehicle 10 (other traveling vehicles, signs, obstacles, hazards, etc.). Processor 12 may interface with autonomous control system 24 to generate the plan view, or alternatively, autonomous control system 24 may generate the plan view and provide the plan view to processor 12. Autonomous control system 24 may assist in generating the plan view as a result of the GPS, radar and lidar information that autonomous control system 24 uses to generate a general representation of objects around vehicle 10. The plan view may be similar to the top-down view shown in the example of FIG. 2. In this respect, vehicle 10 may generate one or more images (which may be referred to as "contextual images") capable of assisting the primary occupant in maintaining awareness of the operating context in which the vehicle is currently autonomously operating.

Processor 12 may next interface with display 20 to present the one or more generated contextual images proximate to or overlapping the determined focus location within the cabin of vehicle 10 to assist the primary occupant in assuming control of vehicle 10, e.g., when vehicle 10 is no longer able to autonomously control the operation of vehicle 10 or when vehicle 10 is able to autonomously control the operation of vehicle 10 but may be compromised in some respect that may impair safety or accuracy. Display 20 may, as one example, project the contextual images onto various surfaces within the cabin of vehicle 10, such as a table at which the occupant has been determined to be focused on while reading or playing a game, a window out of which the primary occupant is gazing, an area adjacent to another occupant with whom the primary occupant is conducting a conversation, etc.

Display 20 may project the contextual images proximate to, but not directly overlapping, the determined focus location (which may also be referred to as a "position") to avoid overt disturbances to the primary occupant or other occupants. For example, display 20 may present the contextual images to avoid projecting the image over the face of another occupant with whom the primary occupant is conducting a conversation. How proximate display 20 projects the contextual images may depend on what may be referred to as a cabin context, as described below in more detail. Processor 12 may direct display 20 to reposition the projection of the contextual images based on the detected cabin context.

In some examples, display 20 may project the contextual images in a manner that overlaps the determined focus location. Display 20 may, as one example, project the contextual image such that a portion of the contextual image is on top of, or in other words, overlaps the determined focus location when handoff is imminent so as to better regain user contextual awareness.

Display 20 may also present the contextual images via one or more active displays positioned throughout the cabin of vehicle 10, selecting which combination of active displays based on the determined focus location. When the selected one of the active display is currently displaying images depicting entertainment content (e.g., videos, images, games, etc.), display 20 may generate a composite image that includes both the images depicting entertainment content and the contextual images. Although display 20 is described as generating the composite image, processor 12 may also generate the composite image and provide the composite image to display 20 for display to the occupant.

When generating the composite image, processor 12 may overlay the contextual image on the entertainment content setting the transparency of the contextual image based on various criteria. One example criteria is the urgency with which control of vehicle 10 is to be transferred to the occupant. That is, processor 12 may determine a time to transfer control of vehicle 10 to the occupant and reduce the transparency of the contextual images such that the occupant is able to better see the contextual images without the distraction of the entertainment material and thereby improve contextual awareness of the operating environment. When vehicle 10 resumes autonomous control, processor 12 may increase the transparency of the contextual images.

Other criteria for modulating transparency of the contextual images may be based on the content of the scene shown in the contextual images. Processor 12 may perform visual analysis to determine a alert or risk level of objects shown in the contextual images. For example, small or hard to see (because of dark colors or low-contrast) vehicles may represent a larger risk to vehicle 10. Processor 12 may decrease the transparency of the contextual images such that the occupant is able to better see the contextual images without the distraction of the entertainment material and thereby improve contextual awareness of the operating environment. When the alert or risk level decreases, processor 12 may increase the transparency of the contextual images.

Processor 12 may also interface with user interface 22 to provide the contextual images such that the contextual images can be displayed by extended displays (such as a tablet computer, mobile phone, head mounted display, or other connected device with which the primary occupant is currently interacting). Processor 12 may provide user interface 22 with the contextual images, which in turn provides the contextual images to the extended displays. The extended displays may generate the above noted composite image and present the composite images to the primary occupant.

Display 20 may also perform various aspects of the techniques described above in addition to processor 12 or as an alternative to processor 12. That is, when display 20 represents a head-mounted display, the head-mounted display may perform the eye tracking to determine the location at which the occupant is gazing, receive the contextual images from vehicle 10 and present the contextual images to the occupant proximate to the determined location. Accordingly, any aspect of the techniques described with respect to processor 12 may alternatively or also be performed by a head-mounted display.

Additionally, display 20 may also present, via a heads-up display, images that trigger physiological reactions in the occupant to regain the driving awareness. Processor 12 and/or GPU 20 may generate synthetic (or, in other words, virtual) objects that emphasize identified objects viewed in the heads-up display. For example, processor 12 may interface, via user interface 22, with the heads-up display to frame a motorcycle or other vehicle on the road that may be small but of importance in terms of awareness.

As further examples, when another vehicle traveling within the vicinity of autonomous vehicle 10 communicates that the vehicle has identified a hazard, processor 12 may interface with display 20 or user interface 22 to present images that emphasize the vehicle detecting the hazard more than other vehicles that have not communicated detection of the hazard. Processor 12 may, as another example, generate images having virtual objects that emphasize vehicles, e.g., vehicles that are high risk, traveling within the vicinity of autonomous vehicle 10 based on how much the vehicle is swerving in the lane, how much the vehicle traveling along with the autonomous vehicle is accelerating/decelerating or how often the vehicle changes lanes, etc. Processor 12 may also generate images having virtual objects that emphasize other vehicles based on color (or contrast), where darker vehicles (or vehicles with low-contrast appearance, e.g., due to sun glare or other ambient lighting conditions) may be emphasized more considering that darker colors (or low-contrast objects) are more difficult to identify.

Processor 12 may interface with the heads-up display to insert artificial objects emphasizing various conditions or vehicles that may trigger a physiological reaction in the occupant. For example, processor 12 may insert artificial lane marker objects at the detected edges of the lane, keeping such lane markers small when under safe operation of vehicle 10 but enlarging such lane markers to create visual arousal prior to transitioning control so as to regain occupant awareness.

In this respect, various aspect of the techniques set forth in this disclosure may facilitate occupant awareness in autonomous vehicles when the vehicle has automated some aspect of the driving. The techniques may maintain occupant awareness so that the primary occupant and potentially other occupants may monitor the current driving context should the primary occupant be suddenly put in control of the vehicle. Such driving context may allow the primary occupant to more safely operate the vehicle upon receiving sudden control.

Although described as being performed by processor 12, various aspects of the techniques described in this disclosure may be performed by GPU 14 or a combination of processor 12 and GPU 14. As such, reference to processor 12 above may be understood to refer to one or more processors, which may include processor 12, GPU 14, a combination of processor 12 and GPU 14, or any combination of various processors, some of which may not be shown in the example of FIG. 1.

Furthermore, although described as being performed in the context of vehicle 10 that is capable of autonomous control of the operation of vehicle 10, the techniques described in this disclosure may apply to any type of vehicle whether capable of autonomous control or not. That is, a level one vehicle that cannot autonomously pilot the vehicle may perform the techniques described in this disclosure. As such, the techniques should not be limited to autonomous vehicles.

Figure 2:
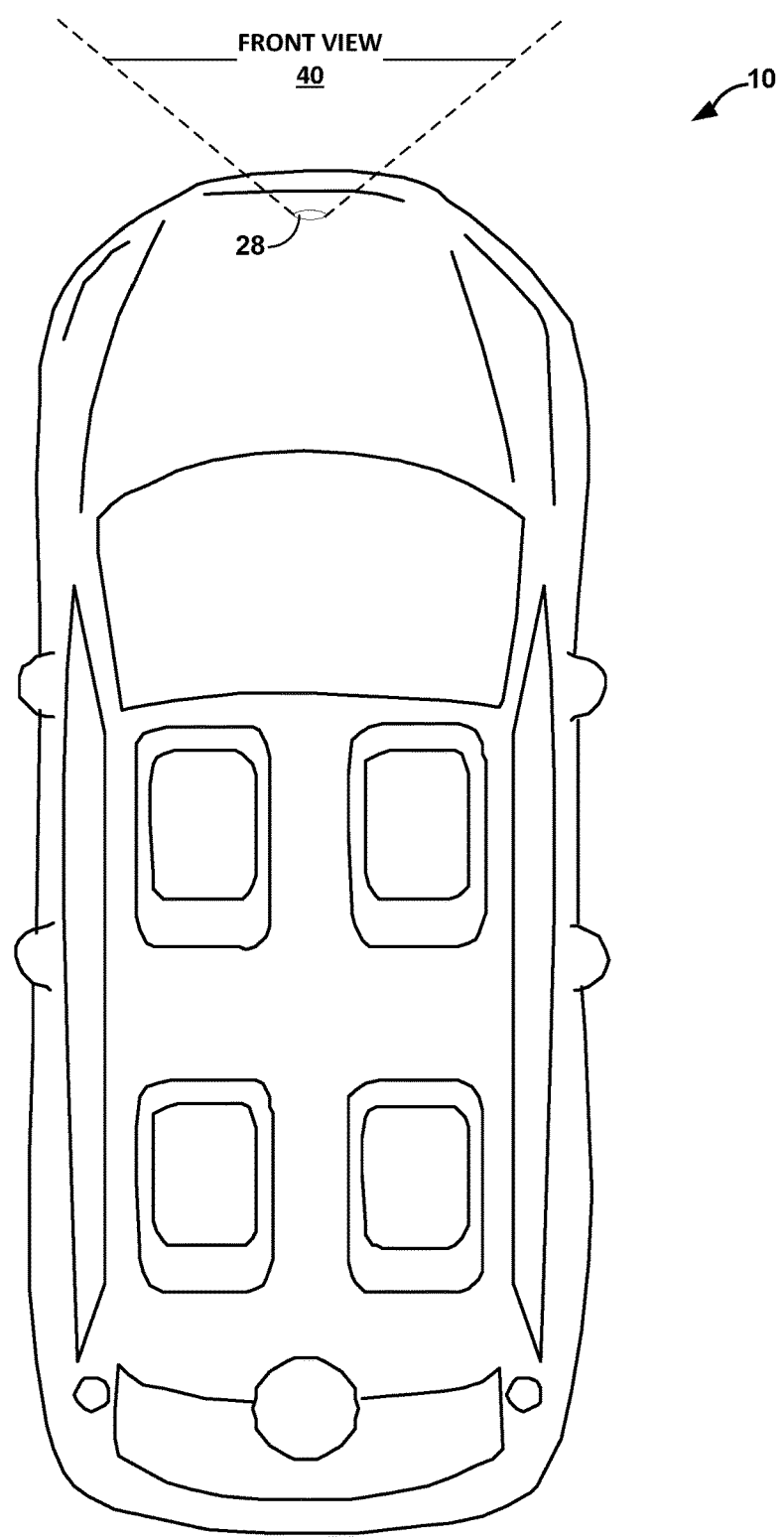
FIG. 2 is a diagram illustrating an overhead view of an example autonomous vehicle configured to perform various aspects of the techniques described in this disclosure.

FIG. 2 is a diagram illustrating an overhead view of an example autonomous vehicle 10 configured to perform various aspects of the techniques described in this disclosure. In the example of FIG. 2, autonomous vehicle 10 includes camera 28 mounted externally near the front of vehicle 10. Camera 28 may capture front view 40, which autonomous vehicle 10 may present, as one example, proximate to the determined location within the cabin of vehicle 10 at which the primary occupant is focused.

Figure 3A:
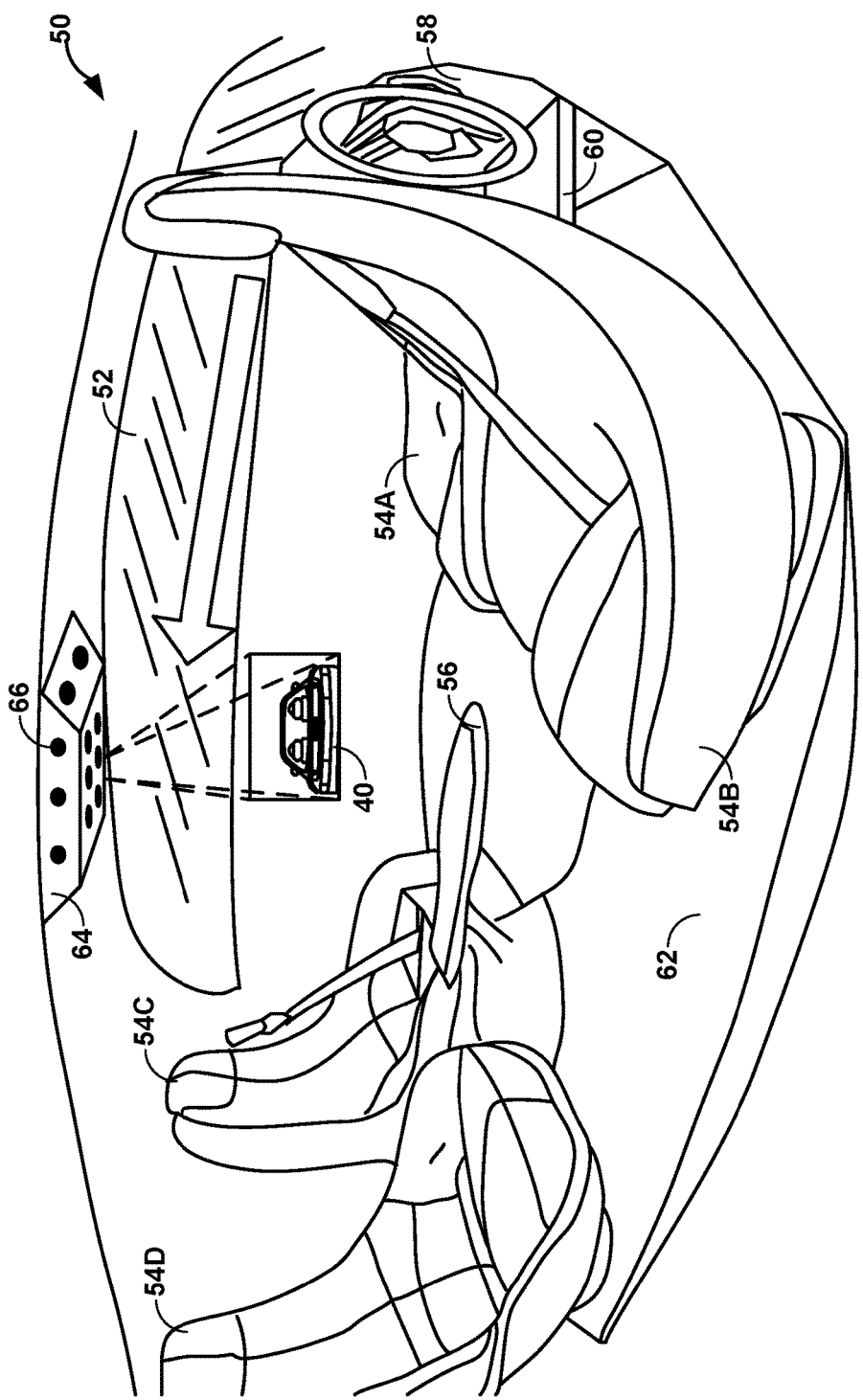
FIGS. 3A-3E are diagrams illustrating different examples of a cabin of the autonomous vehicle shown in FIGS. 1 and 2 in which one or more contextual images are presented in accordance with various aspects of the techniques described in this disclosure.

FIGS. 3A-3E are diagrams illustrating different examples of a cabin 50 of autonomous vehicle 10 in which one or more contextual images are presented in accordance with various aspects of the techniques described in this disclosure. In the example of FIG. 3A, occupant tracking unit 26 may determine that the primary occupant is focused on window 52 within cabin 50. Processor 12 may interface with camera 28 to capture images of forward view 40 (where such images may be referred to as "forward view 40" below for ease of reference). Processor 12 may next interface with display 20 to project forward view 40 proximate to window 52.

To determine where within cabin 50 to project forward view 40, processing unit 12 may determine a cabin context. Processing unit 12 may have a pre-configured cabin context that defines the geometry of cabin 50 along with specifying the location of window 52, seats 54A-54D, table 56, dashboard 58, console 60, cabin floor 62, and overhead unit 64 relative to one another. Processor 12 may, in some examples, generate the cabin context through analysis of cabin 50 using cameras 66 of occupant tracking unit 26 positioned in overhead unit 64 to determine the geometry of cabin 50 along with the various locations noted above. In some examples, processor 12 may be pre-configured with the cabin context (e.g., by the manufacturer), which may result in a pre-defined cabin context that, in some examples, may be updated using cameras 66 as the cabin context changes over time.

Processor 12 may, based on the cabin context, determine a location within cabin 50 proximate to the focus location on the window 52 at which to project forward view 40. In the example of FIG. 3A, processor 12 may determine that the focus location of the primary occupant is out window 52. Processor 12 may then select the projection location to be proximate to window 52 such that little or no portion of forward view 40 overlaps with window 52. Processor 12 may avoid projecting forward view 40 on window 52 as window 52 may not provide sufficient reflections to allow the primary occupant to view forward view 40 with enough clarity to maintain contextual awareness.

Figure 3B:
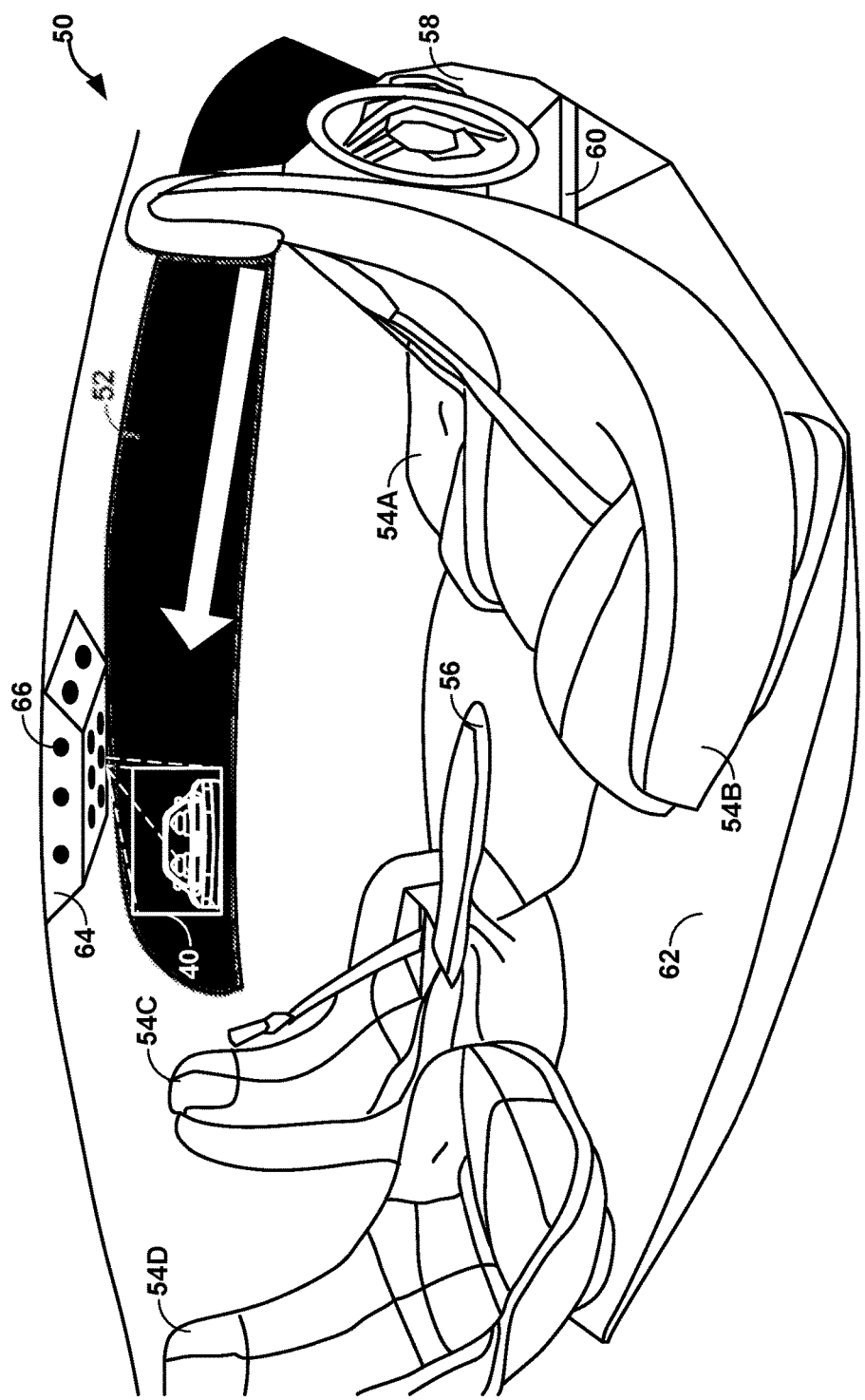

In some instances, processor 12 may determine the proximate location (or proximate location) to the focus location based on external factors. In the example of FIG. 3B, processor 12 may determine the projection location proximate to the determined focus location to overlap with window 52 when processor 12 determines there is insufficient back light coming through windows 52 (e.g., based on a time of day, and/or via interactions with autonomous control system 24).

Although described with respect to window 52, processor 12 interfaces with display 20 to project forward view 40 on any surface within cabin 50, including seats 54A-54D, table 56, dashboard 58, console 60, and floor 62. Furthermore, although not shown in the example of FIGS. 3A and 3B, display 20 may project forward view on the ceiling of cabin 50 using other display elements (e.g., a projector) mounted on floor 62 or other surfaces of cabin 50.

Figure 3C:
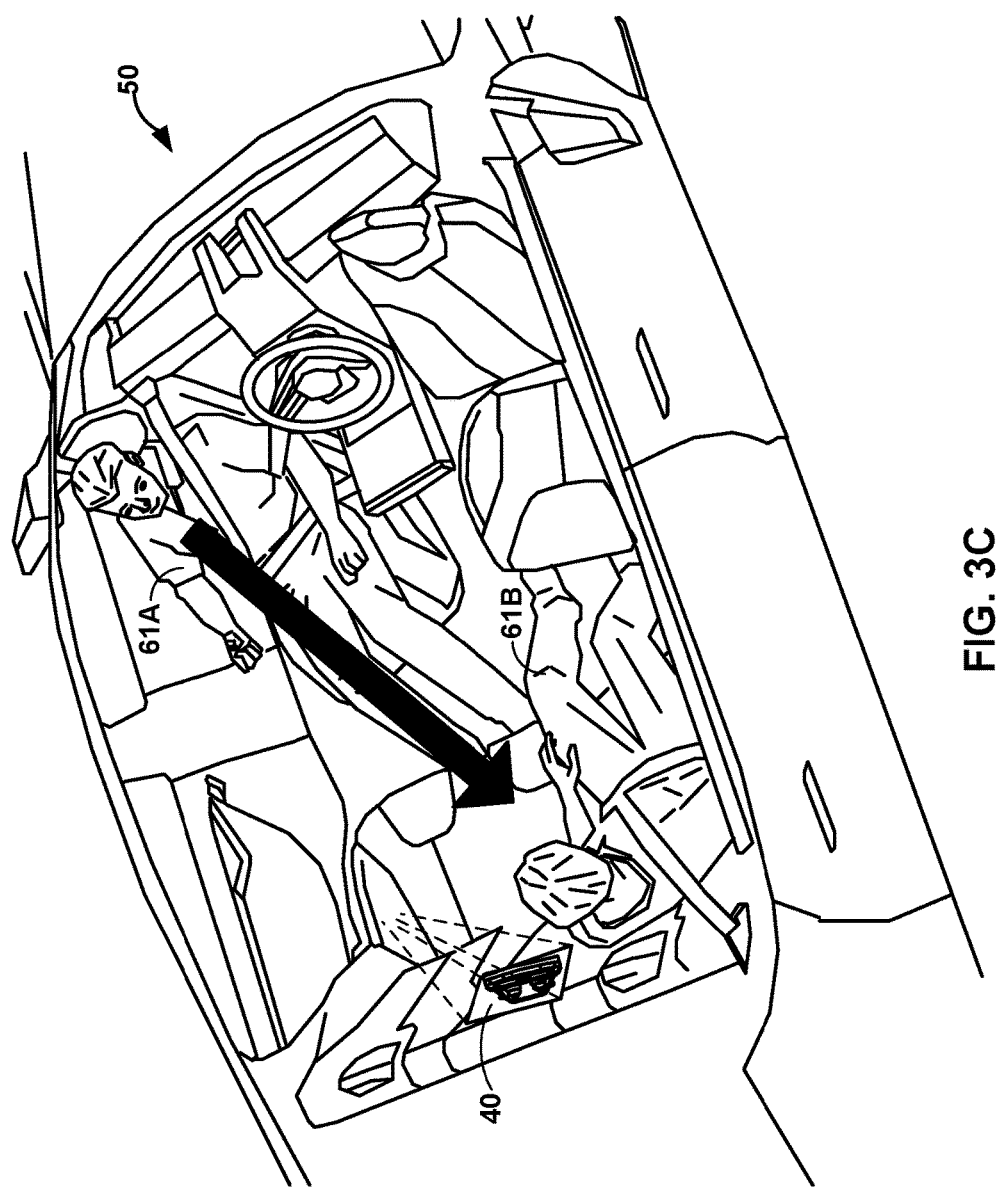

FIG. 3C is a diagram illustrating a cut-away view of cabin 50 of vehicle 10 in which various aspects of the techniques described in this disclosure are performed. In the example of FIG. 3C, a primary occupant 61A is conducting a conversation with a secondary occupant 61B while autonomous control system 24 is currently autonomously in control of vehicle 10. Occupant tracking unit 26 may determine that the primary occupant 61A is focused directly on secondary occupant 61B. Occupant tracking unit 26 may provide the determined focus location to processor 12.

Processor 12 may maintain the above noted cabin context such that processor 12 is aware of the location within cabin of both primary occupant 61A and second occupant 61B. Processor 12 may compare the determined focus location to the cabin context. When, as is the case in the example of FIG. 3C, processor 12 determines that the determined focus location is proximate to the location of secondary occupant 61B, processor 12 may determine the projection location of forward view 40 to be such that the projection of forward view 40 does not overlap with secondary occupant 61B.

Figure 3D:
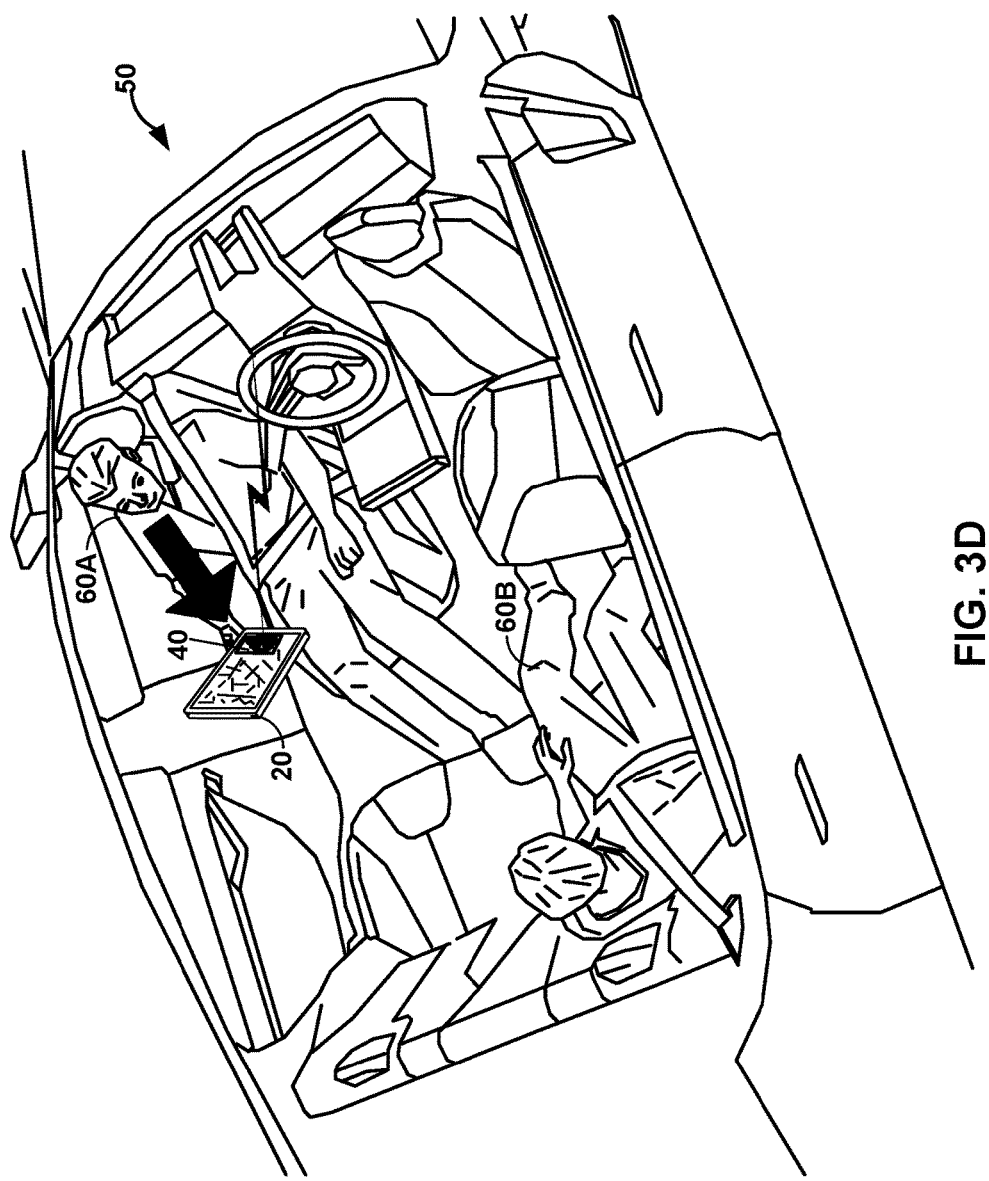

In the example of FIG. 3D, occupant tracking unit 26 may determine that primary occupant 61A is focused on display 20, which is shown in the example of FIG. 3D as a tablet computer (which may represent one type of active display) in wireless communication with vehicle 10. As such, occupant tracking unit 26 may provide the focus location as a location of display 20 to processor 12. Processor 12 may maintain the cabin context to identify the location of display 20 (and any other displays or devices wireless coupled to vehicle 10), comparing the determined focus location to the location of display 20. When, as is the case shown in the example of FIG. 3D, the determined focus location is proximate to the location of display 20, processor 12 may interface with display 20 via user interface 22 to present forward view 40 on the display.

In some examples, display 20 may present forward view 40 as a picture within a picture of whatever content is currently being displayed by display 20. In these and other examples, display 20 may present forward view 40 as a layer below whatever content is currently being displayed by display 20, where the content may be semi-transparent to permit primary occupant 61A to simultaneously view both the content and forward view 40. Although described as interfacing with a display 20 that is wirelessly coupled to vehicle 10, processor 12 may also present forward view 40 on displays that are integrated or fixed within cabin 50 and/or coupled by a wired connection to vehicle 10.

Figure 3E:
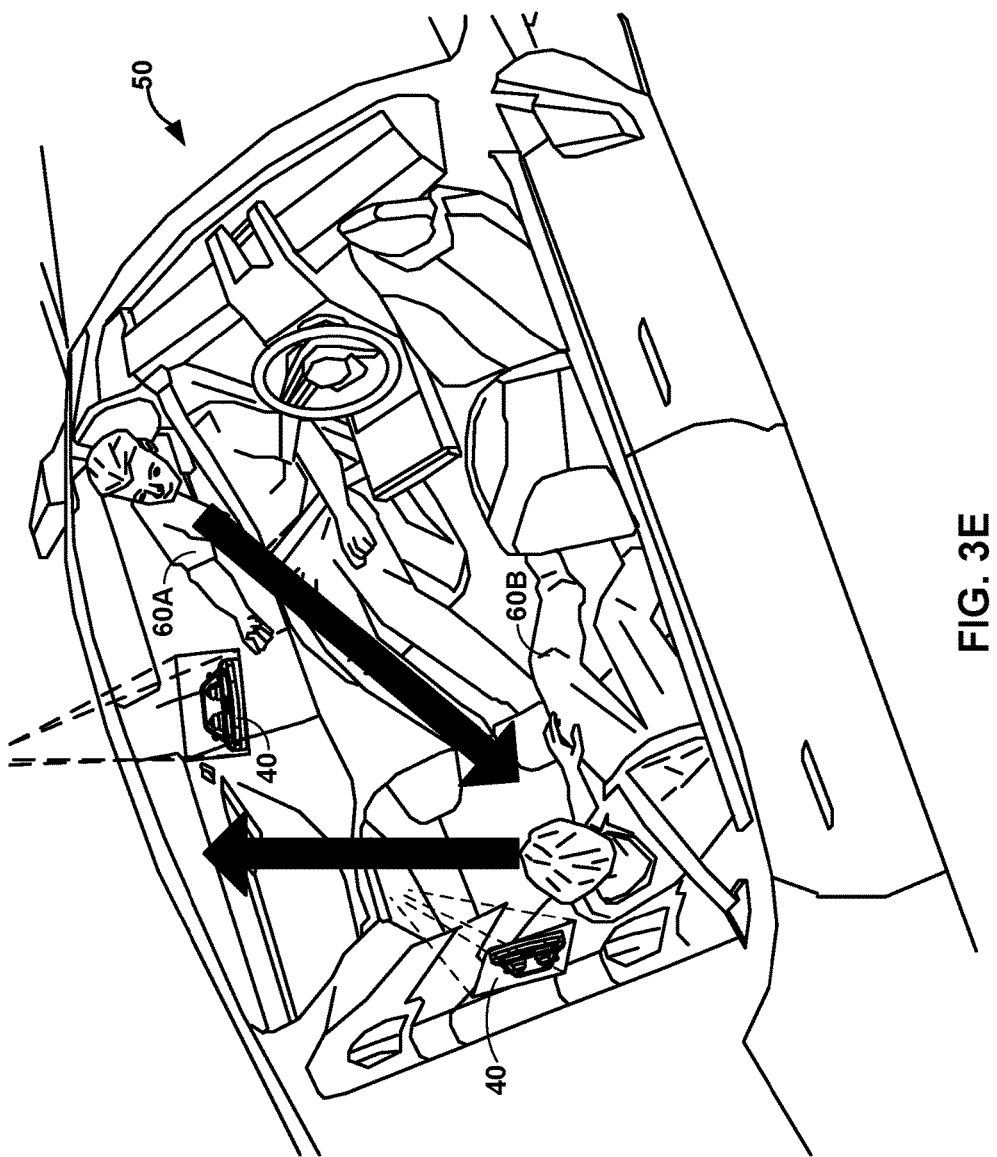

In the example of FIG. 3E, occupant tracking unit 26 may determine the focus location for both primary occupant 61A and secondary occupant 61B. Occupant tracking unit 26 may provide the focus location for the primary occupant 61A ("primary focus location") and the focus location for secondary occupant 61B ("secondary focus location") to processor 12. Processor 12 may interface with display 20 to present forward view 40 proximate to one or more (such as both in the example shown in FIG. 3E) of the primary focus location and the secondary focus location. Presenting forward view 40 at the secondary focus location may allow secondary occupant 61B to also maintain contextual awareness of vehicle 10. As such, secondary occupant 61B may assist primary occupant 61A in maintaining sufficient awareness to take over control of vehicle 10.

Figure 4:
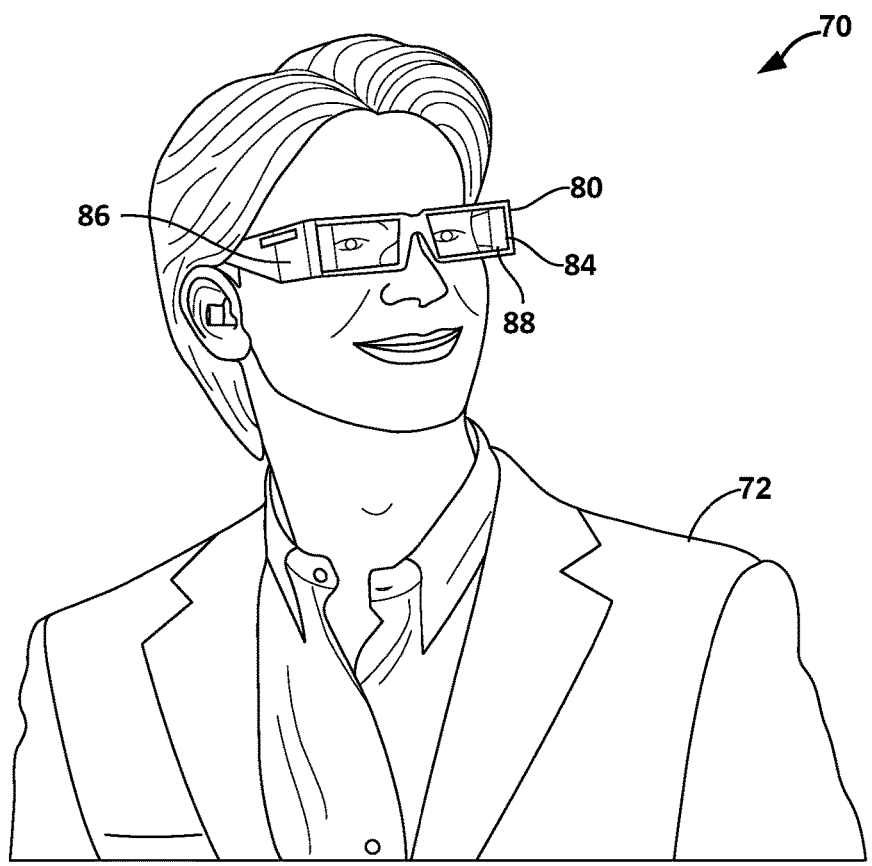
FIG. 4 is a diagram illustrating an example of a head-mounted display system 70 configured to perform various aspects of the techniques described in this disclosure.

FIG. 4 is a diagram illustrating an example of a head-mounted display system 70 configured to perform various aspects of the techniques described in this disclosure. Head-mounted display (HMD) system 70 includes an HMD 80 that can be worn by occupant 72, which may represent one or more of primary occupant 61A or secondary occupant 61B. HMD 80 may be configured to be worn by occupant 72, e.g., similar to a pair of glasses, with a frame 84 having arms 86 extending from lens holders 88. HMD 80 is configured to communicate wireless with vehicle 10 and may act as an extension of user interface 22.

In some examples, HMD 10 may include a processor separate from processor 12 along with system memory, a GPU, and other computing components separate from those of vehicle 10 described above with respect to the example of FIG. 1. In other examples, HMD 10 may simply constitute an extension of display 20, where processor 12 interfaces with HMD 10 to present various images, such as forward view 40.

Processor 12 may, in any event, provide the contextual images (e.g., forward view 40) to HMD 10, which may present forward view 40 so as to maintain contextual awareness by occupant 72. Processor 12 may interact with HMD 10 to present the images via HMD 10 in a manner similar to that discussed above with regard to projecting forward view 40 in the context of the examples shown in FIGS. 3A-3E, taking into consideration the cabin context where appropriate.

However, because HMD 80 moves with where occupant 72 is focusing within cabin 50 of vehicle 10, processor 12 may, in some examples, indicate that HMD 80 is to present forward view 40 in a set location (e.g., an upper right corner) of HMD 80 rather than present forward view 40 at an anchored location within cabin 50. That is, HMD 80 may present forward view 40 at a particular location within cabin 50 such that forward view 40 appears to be anchored at the location similar to that described above with respect to projecting forward view 40 at a particular location proximate to the determined focus location. Alternatively, HMD 80 may always present forward view 40 in a given segment (e.g., the upper right corner) of HMD 80 itself so that forward view 40 may appear to float within cabin 50 where occupant 72 is currently focusing. Processor 12 may detect when occupant 72 is looking forward and selectively deactivate display of forward view 40 upon detecting when occupant 72 is looking forward.

When processor 12 detects that occupant 72 is looking forward, processor 12 may interface with HMD 80 to display synthetic or, in other words, virtual objects that emphasize various objects within the forward view of occupant 72. Although described with respect to augmenting the forward view of occupant 72, processor 12 may also augment the images of the forward view (which is referred to herein as "forward view 40") captured by camera 28 in a similar manner to that described below with respect to augmenting the forward view of occupant 72. Furthermore, although described herein with respect to HMD 80, the techniques may be performed with respect to any type of device capable of augmenting a forward view of occupant 72, such as a heads-up display (HUD).

One example purpose of using emphasis is to stimulate occupant 72 so that occupant 72 may quickly become aware of the driving context with sufficient time to potentially take over control of vehicle 10. The human visual system (HVS) is sensitive to certain visual stimulus, which processor 12 may recreate via HMD 80 to regain awareness by occupant 72 of the operating context of vehicle 10. For example, the HVS is sensitive to objects appearing where no objects were previously observed before, motion across the visual field, and sudden changes in rates of objects.

The HVS may process these visual cues, focusing on the area where the events occurred, and potentially inducing an increase in arousal or, in other words, awareness. For example, the HVS may induce awareness upon perceiving an object moving quickly towards the eyes/face, which may result in an increase in arousal (e.g., adrenalin release, and an increase in heart rate and blood pressure) followed by a flinch reflex to protect the eyes and face. The stimulus that causes such a reaction may depend further on a state of occupant 72, where a tired or impaired driver may require more stimulus to trigger the arousal. As such, it may require a larger change in speed, or a larger object appearing, to generate the same level of visual arousal. Various aspects of the techniques described in this disclosure may employ HMD 80 to trigger the physiological reactions.

FIGS. 5A-5C are diagrams showing example forward views 90A-90C having different levels of emphasis applied in accordance with various aspects of the techniques described in this disclosure. Forward views 90A-90C may represent either images of forward views (which is referred to above as forward view 40) or actual forward views viewed through HMD 80.

In the example of FIG. 5A, forward view 90A does not include any emphasis and, therefore, represents a forward view free of augmentation by way of virtual objects. Forward view 90A shows a small vehicle (e.g., motorcycle 92, where the bracket denoting motorcycle 92 is not displayed on the screen and is used only for reader reference) that is in the same lane as vehicle 10 and which vehicle 10 is following. In the example of FIG. 5B, forward view 90B is the same or substantially the same as forward view 90A except that forward view 90B includes two minor virtual objects 94A and 94B presented by HMD 80 to emphasize a condition, e.g., the presence of vehicle 92. In the example of FIG. 5C, forward view 90C is the same or substantially the same as forward view 90A except that forward view 90C includes two major virtual objects 96A and 96B presented by HMD 80 to emphasize a condition.

To augment forward view 90B or 90C, processor 12 may capture images of forward view 90B or 90C (where the forward view may be denoted as "forward view 90") using camera 28 or a camera mounted on HMD 80. Processor 12 may analyze the images of forward view 90 (which may represent one example of forward view 40 discussed above) to detect a condition that may benefit from emphasis. The condition may represent some type of condition pertinent to operation of vehicle 10 in the event control is transferred to an occupant, e.g., when vehicle 10 is no longer able to autonomously control the operation of vehicle 10.

In the example of FIGS. 5B and 5C, the condition is one of a size of vehicle 92. The size may represent a condition when a size of vehicle 92 is below a threshold size. That is, processor 12 may determine that vehicle 92 has a size less than a threshold size and, based on the determination, emphasize vehicle 92 using either minor emphasis objects 94A, 94B or major emphasis objects 96A, 96B. Processor 12 may interface with HMD 10 to present either minor virtual objects 94A, 94B or major virtual objects 96A, 96B. Processor 12 may determine whether to present minor virtual objects 94A, 94B or major virtual objects 96A, 96B based on one or more factors as described in more detail below. Briefly, some factors may include results from sensors measuring a state of the primary occupant (e.g., to determine a level of tiredness, etc.), a perceived threat of the condition (e.g., as measured by how erratic driving by vehicle 92 has been), and the like.

Figure 6A:
FIGS. 6A-6C are diagrams showing example forward views having different levels of emphasis applied in accordance with various aspects of the techniques described in this disclosure.
Figure 6B:
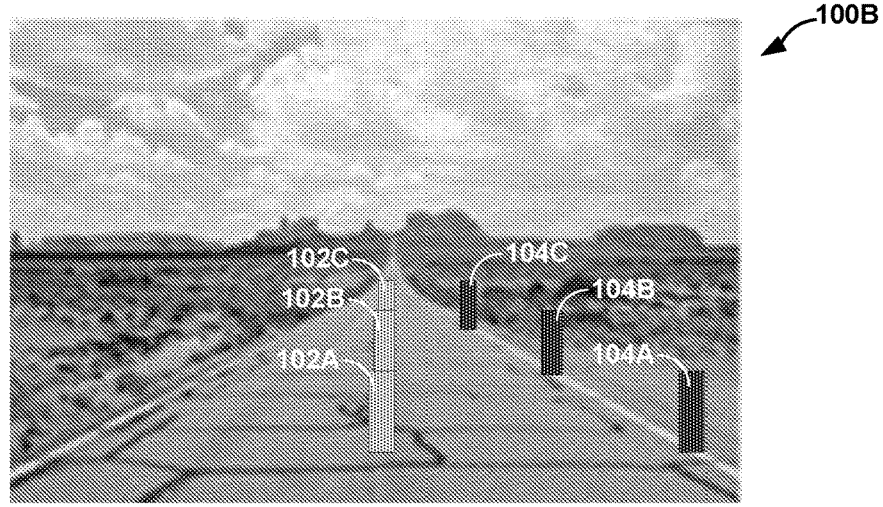
Figure 6C:
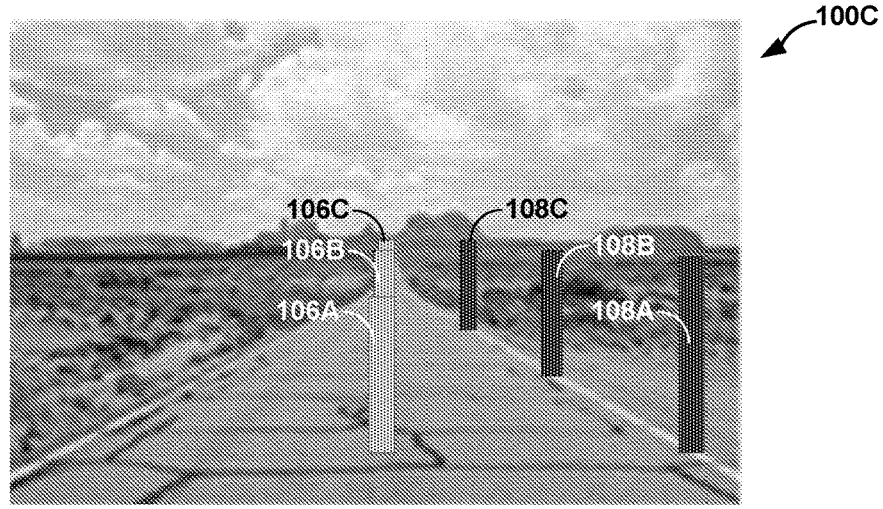

FIGS. 6A-6C are diagrams showing example forward views 100A-100C having different levels of emphasis applied in accordance with various aspects of the techniques described in this disclosure. Forward views 100A-100C may represent either images of forward views (which is referred to above as forward view 40) or actual forward views viewed through HMD 80.

In the example of FIG. 6A, forward view 100A does not include any emphasis and, therefore, represents a forward view free of augmentation by way of virtual objects. Forward view 100A shows a long straight road. In the example of FIG. 6B, forward view 100B is the same or substantially the same as forward view 100A except that forward view 100B includes three minor virtual objects 102A-102C marking a center line of the road and three minor virtual objects 104A-104C marking an outside line of the road, both of which may be presented by HMD 80 to emphasize the lane in which vehicle 10 is currently driving. In the example of FIG. 5C, forward view 100C is the same or substantially the same as forward view 100A except that forward view 100C includes three major virtual objects 106A-106C marking a center line of the road and three major virtual objects 108A-108C marking an outside line of the road, both of which may be presented by HMD 80 to emphasize the lane in which vehicle 10 is currently driving.

HMD 80 may present virtual objects 102A-108C (which may also be referred to as "artificial reality objects 102A-108C") to increase visual arousal. When driving down an open road with no other traffic, such as that shown in FIGS. 6A-6C, HMD 80 may present virtual reality objects 102A-108C that represent lane markers, which are synchronized with the detected edges of the lane. When presenting minor virtual objects 102A-104C to act as lane markers, HMD 80 may mark the edges of the lane. When presenting major virtual objects 106A-108C, HMD 80 may induce a higher level of visual arousal in occupant 72 as major virtual objects 106A-108C may appear as large objects that seem to move towards occupant 72. HMD 80 may increase a size of virtual objects 102A-104C when increased alertness of occupant 72 may be required, e.g., just before handoff of control from autonomous control system 24 to occupant 72, or when another system detects that occupant 72 is tired or otherwise impaired.

HMD 80 may also assist with maintaining awareness with tired and/or impaired occupants. Tired and/or impaired occupants tend to look lower and lower in their visual fields. Since driving is possible (but likely not very safe) by looking at nothing but the road immediately in front of the vehicle and the instruments, a driver who is very tired often continues to drive in this condition. HMD 80 may attempt to address the lowering visual field of tired and/or impaired occupants by moving heads-up instruments to different parts of the visual field, which can help in two ways. First, moving heads-up instruments may keep important (but not safety critical) information higher in the visual field, thereby potentially reducing the tendency to look down. Second, HMD 80 may present safety-critical information (e.g., speed warnings, closing speed warnings, indications that autonomous control is about to disengage, vehicle failures, etc.) lower in the visual field, thereby potentially ensuring occupant 72 can see safety-critical information even when his field of view is lowering.

HMD 80 may initiate the movement of instruments when another system within the car (e.g., an occupant-alertness detection system, which may be implemented by occupant tracking unit 26) determines that the occupant 72 may be tired or impaired. Alternatively, HMD 80 may move instruments routinely to maintain awareness.

Although many of the foregoing aspects of the techniques may be implemented at any time, attempts to heighten awareness by emphasizing visual cues, moving visual entities around or changing presentation of visual information may not result in visual arousal for long sustained amounts of time. Occupants may become acclimated to the changes such that HMD 80 may no longer induce visual arousal. HMD 80 may induce visual arousal more effectively when utilizing the foregoing techniques for brief or short periods of time.

In the case of a handoff of control, HMD 80 may perform the foregoing aspects of the techniques for a short time prior to control handoff. In some cases, processor 12 may implement a handoff predictor algorithm to predict when a handoff is likely to occur. Processor 12 may then interface with HMD 80 to present the emphasis a fixed time before handoff is predicted to occur. In the case of a tired or impaired occupant, HMD 80 may perform the foregoing aspects of the techniques long enough for the driver to pull off the road and bring the vehicle to a safe stop (e.g., in response to HMD 80 prompting occupant 72 to do so).

Processor 12 may detect a number of different conditions and/or objects (potentially working in conjunction with one or more of user interface 22, autonomous control system 24, and occupant tracking unit 26) that may benefit from emphasis. In the example of FIGS. 5A-5C, processor 12 may identify motorcycle 92 and determine from the size of motorcycle 92 that emphasis by way of virtual objects 94A, 94B or 96A, 96B is to be presented to increase the perceived size of motorcycle 92. Increasing the perceived size of motorcycle 92 may allow occupant 72 greater awareness of motorcycle 92 such that occupant 72 may not overlook motorcycle 92.

Other conditions include those based on visual speed. Processor 12 may determine when another vehicle is approaching too rapidly. Processor 12 may detect the approaching vehicle using camera 28 or other cameras, lidar apparatuses, and the like used by autonomous control system 24. Processor 12 may compare a closing rate for each object surrounding vehicle 10 (or only those determined to intercept vehicle 10), comparing the closing rate to a threshold rate. When the closing rate exceeds the threshold rate, processor 12 may determine that another object (e.g., such as a vehicle) is approaching too rapidly. Processor 12 may then interface with HMD 80 to emphasis objects closing on vehicle 10 above the threshold rate more than objects that are closing at a slower speed (or potentially not emphasizing these object at all).

The foregoing also applies to vehicles that are decelerating (or "braking"). That is, processor 12 may identify a closing rate of vehicles in front of vehicle 10 when such vehicles are braking. Alternatively, or in conjunction with identifying the closing rate, processor 12 may receive via autonomous control system 24 a notification from another vehicle (via some communication) that such vehicle is braking. Processor 12 may interface with HMD 80 to present virtual objects emphasizing the braking vehicle more than vehicles that are not breaking.

Processor 12 may also receive via autonomous control system 24 a notification from another vehicle (via some communication) that such vehicle has identified a hazard. Processor 12 may interface with HMD 80 to present virtual objects emphasizing the vehicle identifying the hazard more than vehicles that have not identified the hazard.

Processor 12 may also detect, potentially based on information provided by autonomous control system 24, high risk vehicles that have a higher potential of causing handoff. Processor 12 may execute an algorithm or otherwise be configured to predict future actions of another vehicle based on how much the other vehicle is swerving within the lane, how much the other vehicle is accelerating/decelerating, or how often the other vehicle changes lanes. Processor 12 may interface with HMD 80 to present emphasis around the high risk vehicles.

Other conditions include those based on color. Processor 12 may detect darker colored vehicles and interface with HMD 80 to emphasize darker colored vehicles more than lighter colored vehicles. Darker colored vehicles may receive more emphasis as darker colored vehicles may be easier to overlook.

Further conditions include a type of vehicle. Processor 12 may detect emergency vehicles, such as police cars, fire trucks, ambulances, and the like either via image detection or via communication. Processor 12 may emphasize emergency vehicles so that occupant 72 may take appropriate action should handoff occur.

Processor 12 may detect one or more of these conditions with respect to each surrounding object within the view of vehicle 10 or within communication range of vehicle 10, or within the sensing range of sensors of vehicle 10. Surrounding objects may include pedestrians, signs, debris, or other vehicles. Processor 12 may evaluate the closing rates of each surrounding object, any communications received from each surrounding object (e.g., communicating hazards, braking or other statuses), a size of each surrounding object, a color and/or relative visual contrast of each surrounding object, a type of each surrounding object, and possible future actions predicted for each surrounding object to derive a score for visual emphasis.

Processor 12 may compare the visual emphasis score for each surrounding object to a minor emphasis threshold and a major emphasis threshold. When the visual emphasis score is below the minor emphasis threshold, processor 12 may determine that emphasis is not required for the corresponding object. When the visual emphasis score is above the minor emphasis threshold but below the major emphasis threshold, processor 12 may determine that HMD 80 is to present minor emphasis (e.g., using minor virtual objects 94A, 94B) with respect to the corresponding surrounding object. When the visual emphasis score is above the major emphasis threshold, processor 12 may determine that HMD 80 is to present major emphasis (e.g., using major virtual objects 96A, 96B) with respect to the corresponding surrounding object.

Although described with respect to the two examples shown in FIGS. 5A-6C, processor 12 may perform a number of different types of individual emphasis around surrounding objects. Processor 12 may interface with HMD 80 to insert virtual objects that increase not only a size (e.g., for motorcycle 92) and closing rate (e.g., using virtual objects 106A-108C), but also emphasize an area to increase the size or height of the area (such as a pedestrian crossing area).

Processor 12 may also interface with HMD 80 to generate virtual objects having various shapes different than the block based shapes shown in the examples of FIGS. 5A-6C. Processor 12 may interface with HMD 80 to generate virtual objects in the shape of a vehicle closing at a high rate of speed. Processor 12 may interface with HMD 80 to make it appear as if the virtual vehicle shaped object is closing at a rate exceeding the current closing rate to raise the visual arousal of occupant 72.

Processor 12 may also interface with HMD 80 to emphasize various surrounding objects without presenting virtual objects. For example, processor 12 may interface with HMD 80 to increase or decrease a brightness, or increase or decrease a contrast, of a surrounding object.

Emphasis of surrounding objects may further be divided into global emphasis and individual emphasis. That is, processor 12 may utilize the visual emphasis score to not only emphasize individual surrounding objects. Processor 12 may determine an average visual emphasis score (which may be a weighted average in some examples) based on the individual visual emphasis scores of the surrounding objects. Processor 12 may perform various global operations based on the average visual emphasis score, such as decrease or increase transparency of forward view 40, increase or decrease the size of forward view 40 when presented as a picture in a picture, or increase or decrease brightness of display 20 when presenting forward view 40. In some implementations, emphasis scores for various objects may be modified (e.g., increased) when the vehicle is within known hazardous areas such as school crossings or pedestrian crossings.

Figure 7:
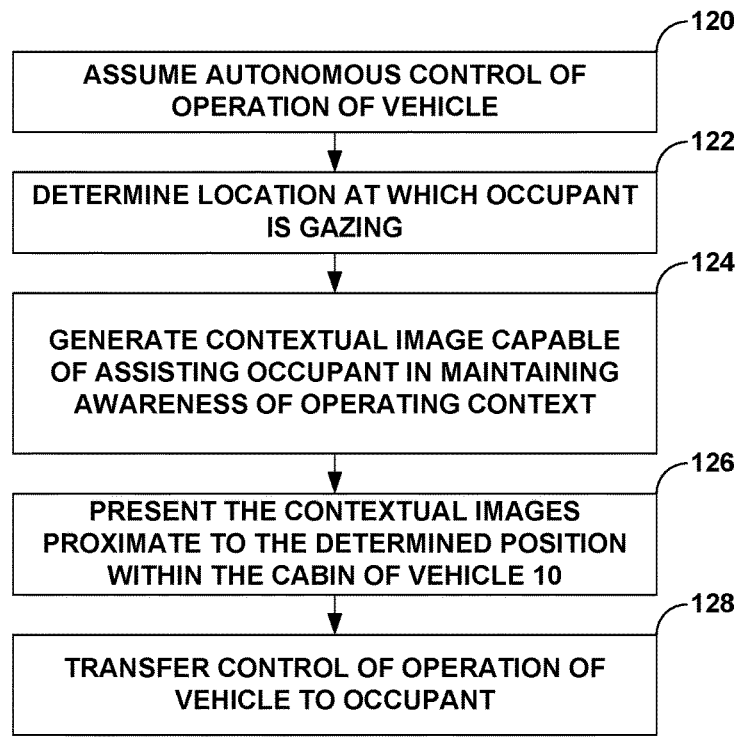
FIG. 7 is a flowchart illustrating example operation of the vehicle of FIG. 1 in performing various aspects of the techniques described in this disclosure.

FIG. 7 is a flowchart illustrating example operation of vehicle 10 of FIG. 1 in performing various aspects of the techniques described in this disclosure. Initially, autonomous control system 24 of vehicle 10 may assume autonomous control of operation of vehicle 10 (120).

After assuming autonomous control of operation of vehicle 10 (or in some instances prior to assuming autonomous control of operation of vehicle 10), processor 12 may interface with occupant tracking unit 26 to determine a location (which may be referred to as a "focus position") at which an occupant is (and potentially two or more occupants are) gazing (122). Occupant tracking unit 26 may perform gaze tracking or any other process by which to determine the focus position.

Processor 12 may next generate one or more contextual images capable of assisting the occupant in maintaining awareness of an operating context (124). The contextual image may include one of a forward view, such as forward view 40, or a plan view, which may be similar to the top-down view shown in the example of FIG. 2. Processor 12 may also update the contextual images to insert synthetic objects in the manner described above, where the synthetic objects may emphasize various objects (e.g., vehicles, pedestrians, signs, lane markers, etc.).

Processor 12 may next interface with display 20 to present the contextual images proximate to the determined position within the cabin of vehicle 10 (126). The contextual images may assist the occupant in assuming control of vehicle 10 when the vehicle is no longer able to autonomously control the operation of vehicle 10. Processor 12 may determine a duration before handoff of control of vehicle 10 to the occupant, and present the images for the determined duration prior to handoff. Processor 12 may, after presenting the contextual images, transfer control of the operation of vehicle 10 to the occupant (128).

Again, transferring control may refer to returning responsibility of control to the occupant such that the occupant directs operation of vehicle 10 (e.g., using a steering wheel, pedals and other implements in traditional vehicles, or using various non-traditional interfaces, such as virtual interfaces that allow for acceleration, braking, and steering). Transferring control may also be only partial transfer of control depending on the circumstances. For example, a sensor allowing for determination of a rate of travel may fail, but all other autonomous control systems for steering and navigation may be operational. In this example, vehicle 10 may transfer control of acceleration and braking but retain control of steering and navigation. As such, vehicle 10 may transfer control of the operation of vehicle 10 when responsibility for one or more autonomously performed operations are transferred to the occupant.

Figure 8:
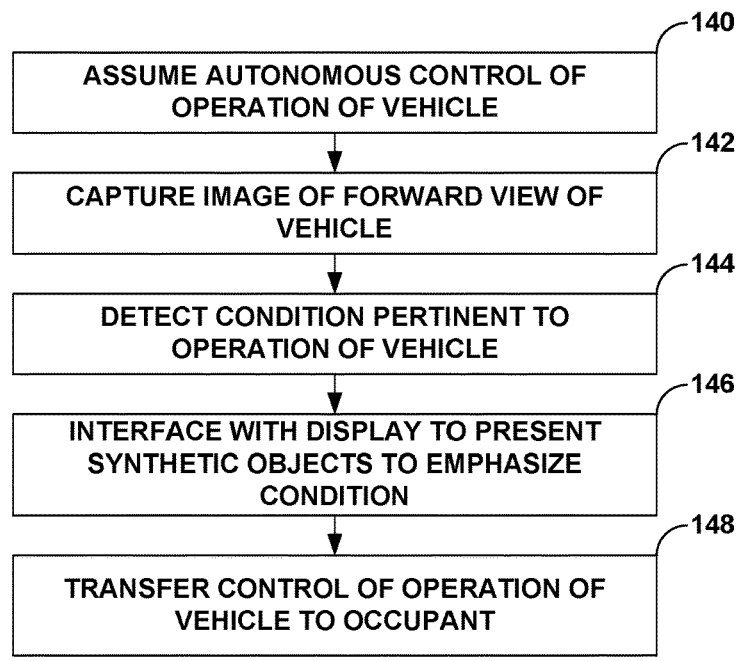
FIG. 8 is a flowchart illustrating example operation of the vehicle of FIG. 1 in performing various aspects of the techniques described in this disclosure.

FIG. 8 is a flowchart illustrating example operation of vehicle 10 of FIG. 1 in performing various aspects of the techniques described in this disclosure. Initially, autonomous control system 24 of vehicle 10 may assume autonomous control of operation of vehicle 10 (140).

After assuming autonomous control of operation of vehicle 10 (or in some instances prior to assuming autonomous control of operation of vehicle 10), processor 12 may interface with camera 28 or any other camera having a forward view of vehicle 10 (such as a camera integrated within HMD 80) to capture an image of forward view, such as forward view 40, of vehicle 10 (142).

Processor 12 may next detect a condition pertinent to the operation of vehicle 10 (144), e.g., in the event vehicle 10 is no longer able to autonomously control the operation of vehicle 10. In some examples, processor 12 may perform a visual image analysis with respect to one or more images in the direction in which vehicle 10 is traveling to detect the various conditions described above. In these and other examples, processor 12 may detect the condition based on data from any of the above noted sensors (e.g., LiDAR, radar, cameras, or sensors providing physiological data for an occupant, etc.).

Processor 12 may next interface with display 20 (which may be a heads-up display or a head mounted display, such as HMD 80) to present synthetic objects to emphasize the condition (146). Processor 12 may determine a duration before handoff of control of vehicle 10 to the occupant, and present the synthetic objects for the determined duration prior to handoff. Processor 12 may, after presenting the contextual images, transfer control of the operation of vehicle 10 to the occupant (148).

Although various aspects of the techniques are described as being performed by vehicle 10, various aspects of the techniques may be performed by other devices with the results provided via a communication protocol to vehicle 10. That is, image or video analysis of contextual images, gaze or eye tracking, occupant tracking, any image or video mixing (e.g., to form the composite image), and transparency determination for the contextual images to provide a few examples may be performed by another vehicle, network servers or computer server farms (that is, by the "cloud") having processors and/or GPUs in place of those or in addition to those of vehicle 12. As such, the techniques should not be limited to being directly performed by the vehicle itself.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of maintaining occupant awareness in a vehicle, the method comprising:
   determining, by one or more processors, a location at which an occupant within the vehicle is gazing;
   generating, by the one or more processors and when the determined location indicates that the occupant is not gazing in a direction in which the vehicle is traveling, one or more contextual images visualizing a context in which the vehicle is currently operating; and
   presenting, by a display and based on the determined location, the one or more contextual images at a location within the vehicle.

2. The method of claim 1, wherein the vehicle comprises the one or more processors, wherein the one or more processors are further configured to autonomously control operation of the vehicle when determining the location and generating the one or more contextual images.

3. The method of claim 2, wherein presenting the one or more contextual images comprises presenting the one or more contextual images proximate to or overlapping, at least in part, with the determined location to assist the occupant in maintaining awareness of the context in the event control of the vehicle is transferred from the vehicle to the occupant.

4. The method of claim 1, wherein determining the location at which the occupant is gazing comprises performing eye tracking.

5. The method of claim 1, wherein a head mounted display comprises at least one of the one or more processors and the display.

6. The method of claim 1, wherein the vehicle includes at least one of the one or more processors and the display.

7. The method of claim 1,
   wherein the occupant is wearing a head mounted display, the head mounted display including the display that presents the one or more contextual images, and
   wherein the vehicle includes a processor of the one or more processors.

8. The method of claim 1,
   wherein the display comprises a projector.

9. The method of claim 1, wherein the display comprises an active display.

10. The method of claim 1, further comprising:
    determining a transparency for the one or more contextual images based on content of a scene shown in the one or more contextual images.

11. The method of claim 10, wherein determining the transparency comprises:
    performing a visual analysis of the one or more contextual images to identify an object of the scene shown in the one or more contextual images;
    determining an alert level of the object to the vehicle; and
    determining the transparency based on the determined alert level.

12. The method of claim 1, wherein the one or more contextual images comprise one of images taken along the direction of travel of the vehicle, or images of a top-down plan view of the vehicle and surrounding objects.

13. The method of claim 1, further comprising augmenting the one or more contextual images to include a virtual object that is associated with a condition in a scene shown in the one or more contextual images or a condition pertinent to operation of the vehicle.

14. The method of claim 13,
    wherein the conditions include at least one of another vehicle detected to be closing toward the vehicle at a rate above a threshold rate, another vehicle communicating a hazard, another vehicle swerving in a lane above a threshold swerve amount, and another vehicle of one or more dark colors or low contrast, and
    wherein the method further comprises:
    determining a visual emphasis score based on the context in which the vehicle is currently operating; and
    adjusting the virtual object based on the visual emphasis score.

15. The method of claim 1, further comprising augmenting the one or more contextual images to include a virtual object that emphasizes an object, wherein the object comprises one of a lane marker, a pedestrian, or another vehicle.

16. The method of claim 15, further comprising:
    determining a visual emphasis score based on the context in which the vehicle is currently operating; and
    adjusting the virtual object based on the visual emphasis score.

17. A device configured to maintain occupant awareness in a vehicle, the device comprising:
    one or more processors configured to:
    determine a location at which an occupant is gazing; and
    generate, when the determined location indicates that the occupant is not gazing in a direction in which the vehicle is traveling, one or more contextual images visualizing a context in which the vehicle is currently operating; and
    cause a display to present, based on the determined location, the one or more contextual images proximate to the determined position within the cabin of the vehicle.

18. The device of claim 17, wherein the vehicle comprises the one or more processors, wherein the one or more processors are further configured to autonomously control operation of the vehicle when determining the location and generating the one or more contextual images.

19. The device of claim 18, wherein the display is caused to present the one or more contextual images proximate to or overlapping, at least in part, with the determined location to assist the occupant in maintaining awareness of the context in the event control of the vehicle is transferred from the vehicle to the occupant.

20. The device of claim 17, wherein the one or more processors perform eye tracking.

21. The device of claim 17, wherein at least one of the one or more processors and the display are included in a head mounted display.

22. The device of claim 17, wherein the vehicle includes at least one of the one or more processors and the display.

23. The device of claim 17,
    wherein a head mounted display includes the display, and
    wherein the vehicle includes a processor of the one or more processors.

24. The device of claim 17,
    wherein the display comprises a projector that projects the one or more contextual images proximate to the determined location.

25. The device of claim 17, wherein the display comprises an active display having at least a portion of the active display overlapping with or adjacent to the determined location.

26. The device of claim 17, wherein the one or more processors are further configured to:
determine a transparency for the one or more contextual images based on content of a scene shown in the one or more contextual images.

27. The device of claim 17, wherein the one or more processors are further configured to:
determine a visual emphasis score based on the context in which the vehicle is currently operating; and
adjust, based on the visual emphasis score, a virtual object that is associated with a condition in the scene or a condition pertinent to operation of the vehicle; and
augment the one or more contextual images to include the virtual object.

28. The device of claim 17, wherein the one or more processors are further configured to:
augment the one or more contextual images to include a virtual object that emphasizes an object, wherein the object comprises one of a lane marker, a pedestrian, or another vehicle.

29. A device configured to maintain occupant awareness in a vehicle, the device comprising:
means for determining a location at which an occupant within the vehicle is gazing;
means for generating, when the determined location indicates that the occupant is not gazing in a direction in which the vehicle is traveling, one or more contextual images visualizing a context in which the vehicle is currently operating; and
means for presenting, based on the determined location, the one or more contextual images at a location within the vehicle.

30. A non-transitory computer-readable storage medium having stored thereon instructions that, when executed, cause one or more processors to:
determine a location at which an occupant within a vehicle is gazing;
generate, when the determined location indicates that the occupant is not gazing in a direction in which the vehicle is traveling, one or more contextual images visualizing a context in which the vehicle is currently operating; and
interface with a display to present, based on the determined location, the one or more contextual images at a location within the vehicle.

* * * * *